(12) United States Patent
Meyer et al.

(10) Patent No.: US 9,140,353 B2
(45) Date of Patent: Sep. 22, 2015

(54) ACTUATING DEVICE WITH ROTARY SWITCH

(75) Inventors: Joerg Meyer, Wagenfeld (DE); Andreas Giefer, Lemfoerde (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 2222 days.

(21) Appl. No.: 11/718,826

(22) PCT Filed: Nov. 8, 2005

(86) PCT No.: PCT/DE2005/002008
§ 371 (c)(1),
(2), (4) Date: May 8, 2007

(87) PCT Pub. No.: WO2006/050702
PCT Pub. Date: May 18, 2006

(65) Prior Publication Data
US 2007/0261509 A1 Nov. 15, 2007

(30) Foreign Application Priority Data
Nov. 9, 2004 (DE) .......................... 10 2004 054 264

(51) Int. Cl.
*F16H 59/08* (2006.01)
*B60K 37/06* (2006.01)
*G05G 1/08* (2006.01)
*G05G 5/03* (2008.04)
(Continued)

(52) U.S. Cl.
CPC ................ *F16H 59/08* (2013.01); *B60K 37/06* (2013.01); *G05G 1/087* (2013.01); *G05G 5/005* (2013.01); *G05G 5/03* (2013.01); *G05G 5/05* (2013.01); *G05G 5/12* (2013.01); *G05G 9/02* (2013.01); *B60K 2350/102* (2013.01); *F16H 61/22* (2013.01); *F16H 2059/0295* (2013.01); *F16H 2059/048* (2013.01); *F16H 2059/081* (2013.01); *Y10T 74/20474* (2015.01)

(58) Field of Classification Search
USPC .............. 74/553, 473.3, 473.31, 335, 473.12, 74/473.18, 473.21, 473.23, 473.28, 74/473.33, 473.35
See application file for complete search history.

(56) References Cited

U.S. PATENT DOCUMENTS 2,926,762 A 3/1960 Edgley
6,474,186 B1 * 11/2002 Vollmar ......................... 74/335
(Continued)

FOREIGN PATENT DOCUMENTS

DE 197 06 625 A1 9/1997
DE 197 46 438 A1 4/1999
(Continued)

*Primary Examiner* — Daniel Yabut
(74) *Attorney, Agent, or Firm* — McGlew and Tuttle, PC

(57) ABSTRACT

An actuating device is provided that includes an actuating element (1) with at least three switching positions. The actuating device (1) can be deflected starting from its basic positions at least in one direction into an intermediate switching position for selecting an operating state of the technical system. For selecting at least one other operating state of the technical system, the actuating element (1) can be deflected, starting from an intermediate switching position, into at least one other switching position that is located farther away from the basic position. The undesired jumping of the actuating element over intermediate switching positions, during switching, is effectively prevented from occurring. An intuitively detectable tactile feedback of the switching state of the actuating element or of the state of the system is provided.

18 Claims, 3 Drawing Sheets

(51) Int. Cl.
 G05G 5/05 (2006.01)
 G05G 5/12 (2006.01)
 G05G 9/02 (2006.01)
 G05G 5/00 (2006.01)
 *F16H 61/22* (2006.01)
 *F16H 59/02* (2006.01)
 *F16H 59/04* (2006.01)

(56) References Cited

U.S. PATENT DOCUMENTS 6,564,661 B2 * 5/2003 DeJonge .................. 74/473.3
6,904,822 B2 * 6/2005 Meyer et al. ................ 74/335
2002/0152827 A1 * 10/2002 Hayashi et al. ........... 74/473.3
2004/0025613 A1 2/2004 Meyer et al.
2004/0107790 A1 * 6/2004 Maeda et al. ............ 74/473.12
2004/0201465 A1 * 10/2004 Meyer et al. ................ 340/438

FOREIGN PATENT DOCUMENTS

| DE | 197 47 269 A1 | 4/1999 |
| DE | 102 17 614 A1 | 11/2003 |
| EP | 1 141 587 | 10/2001 |
| EP | 1 215 555 A1 | 6/2002 |
| EP | 1 347 242 A2 | 9/2003 |

* cited by examiner

ACTUATING DEVICE WITH ROTARY SWITCH

CROSS REFERENCE TO RELATED APPLICATIONS

This application is a United States National Phase application of International Application PCT/DE2005/002008 and claims the benefit of priority under 35 U.S.C. §119 of German Patent Application DE 10 2004 054 264.3 filed Nov. 9, 2004, the entire contents of which are incorporated herein by reference.

FIELD OF THE INVENTION

The present invention pertains to a means for actuating a technical system, especially for a shift-by-wire speed-change gear, in which the actuating device comprises an actuating element with at least three shift positions including a basic position, wherein the actuating element can be deflected from the basic position at least in one direction into an intermediate switching position and can be deflected from the intermediate switching position into at least one other switching position located farther away from the basic position than the intermediate switching position.

BACKGROUND OF THE INVENTION

The gear preselection or control of the operating state of the vehicle transmission is carried out in an increasing number of motor vehicles by means of electrical or electronic signaling. The electrical or electronic actuation of such systems, which makes do without mechanical connection between the actuating element and the device to be controlled, for instance, an automatic gear box, brings with it the circumstance that no appreciable operating forces need to be introduced by the driver into the actuating element any longer and that, in particular, no such forces have to be mechanically transmitted to the transmission.

An actuating device in which the actuation continues to be carried out with relatively bulky, large operating levers despite the elimination of the need for the mechanical force transmission to the technical system being controlled are known from the state of the art. Thus, numerous vehicle transmissions continue to be shifted or controlled with various forms of the classical shift knob or automatic selector lever, even though there is no force transmission any longer between the operating lever and the vehicle transmission because of the shift-by-wire design already being used.

This is associated with drawbacks in various respects. For example, the type and the location of arrangement of the operating lever for a motor vehicle transmission are markedly limited because of the considerable space requirement of such gearshift levers and are limited essentially to the usual accommodation of the gearshift lever in the area of the center console or between the front seats of the motor vehicle. This is accompanied by limitations in terms of design, and the freedom allowed to the vehicle designer is reduced essentially to the usual locations for mounting the gearshift lever. The gearshift lever protruding from the center console is not infrequently also disadvantageous in terms of the freedom of motion for the vehicle occupants.

The classical gearshift or selector levels are also often disadvantageous with respect to safety on the motor vehicle. For example, the clothing of the driver or front-seat passenger may get caught by the gearshift lever during motions and this may compromise the driver's attention to what is happening on the road, or lead even to undesired shifting operations.

Another, frequently likewise safety-relevant problem during the actuation of technical systems by means of classical operating levels is that it may happen relatively easily in case of a plurality of existing shift positions of the operating lever that intermediate positions of the gearshift lever are missed or inadvertently jumped over during shifting. This happens especially when the particular operating element or the particular gearshift lever can assume a plurality of shift positions, which are arranged essentially linearly one after another.

Furthermore, the situation in which technical systems, for example, vehicle transmissions, automatically adapt and change their operating or shifting state to changed general conditions without the direct action of the driver also occurs increasingly frequently, especially in modern motor vehicles with the technical systems used there, which are increasingly strongly interlinked with one another. For example, it is not uncommon that a by-wire-controlled vehicle transmission automatically assumes a certain operating position, for example, the shift position "P" (parking brake) when the engine is stopped and after the ignition key has been removed or as soon as the driver leaves the vehicle.

If the vehicle is equipped with a common transmission actuating element, for example, with an automatic selector lever, the selector level will, however, remain in the shift position selected manually by the driver before, for example, in "N," even in case of the automatically engaged shift position "P." Thus, the operating lever erroneously signals now, due to its unchanged position in the "N" position, that the transmission is in shift position "N," whereas the transmission is actually in the shift position "P" because of the automatic activation of the parking brake. Even though this may not immediately lead to a safety risk in the case of the example selected, there remains at least the problem that the selector lever is in the "N" position when driving is resumed the next time, and difficulties or lack of clarity could therefore arise when engaging the desired gear.

Finally, the prior-art gearshift levers or automatic selector levers are still also disadvantageous in respect to the behavior in a crash, because such projecting actuating elements may be a source of considerable risks in case of a crash, especially in terms of a possible head impact.

As can be easily seen, the cases from the area of the motor vehicle or the control of the gear box are only examples of generally applicable relationships involved in the man-machine interaction in case of electronically controlled technical systems, in which the actuating elements are no longer in connection with the system to be controlled via mechanical linkages or shafts but only via electrical or electronic signals.

SUMMARY OF THE INVENTION

Against this background, the object of the present invention is to provide a means for the by-wire actuation of a technical system, for example, a speed-change gear, with which the drawbacks of the state of the art can be overcome. In particular, the actuating device shall increase the freedom in designing and arranging the actuating element, and the actuating device shall at the same time also be intuitive and self-explanatory to the operator to the extent possible. One important aspect shall also be the unambiguous tactile feedback of the shifting state and the state of the system during the operation of the corresponding actuating element. Finally, especially the risk of jumping over intermediate positions of the actuating element during shifting in an undesired manner shall be effectively prevented from occurring, and the problem of automatic changes in the state of the system with unchanged position of the actuating element shall be eliminated.

The actuating device according to the present invention is intended especially for the manual actuation of a shift-by-wire speed-change gear, for example, of an automatic transmission, and comprises, in a primarily known manner, an actuating element with at least three shift positions, among which there is a basic position. The actuating element can be deflected from its basic position at least in one direction into an intermediate shift position for the purpose of selecting an operating state of the technical system. To select at least one other intermediate shift position of the technical system, the actuating element can be deflected from an intermediate shifting position into another shift position, the latter shift position being removed farther away from the basic position than the first intermediate shift position.

However, the actuating device is characterized according to the present invention in that the actuating element is a rotary switch, the rotary switch resetting automatically into the basic position from all switching positions. The actuating device comprises a locking arrangement against unintended deflection of the rotary switch beyond an intermediate switching position into another switching position.

The design of the actuating element of the actuating device as a rotary switch takes into account especially the fact that no mechanical forces are to be transmitted any longer between the actuating element and the technical system in technical systems that can be actuated electrically or electronically, for example, in shift-by-wire transmissions. This is advantageous because a rotary switch can be embodied with a considerably greater freedom in terms of design and shape and, because of its small space requirement and the optimal ergonomics, which can be adapted to the hand, within easy reach of the operator or driver nearly as desired.

Moreover, the rotary switch of the actuating device according to the present invention resets automatically into the basic position from all switching positions. Thus, the above-described constellation of an automatically changed state of the system (for example, the automatically engaged parking brake when leaving the vehicle) with unchanged position of the actuating element at the same time can no longer lead to the situation that a switching state of the technical system or vehicle transmission that is actually not present is misleadingly signaled by the position of the actuating element. The rotary switch is rather always in its basic position according to the present invention regardless of the switching state of the technical system or the vehicle transmission as long as it is not actuated.

The blocking device of the rotary switch, which is additionally present in the actuating device according to the present invention, prevents the above-described unintended jumping over of intermediate positions or intermediate switching positions of the rotary switch during switching and leads, moreover, to the possibility of intuitive operation thanks to clear tactile guiding or feedback during the selection of the individual switching positions on the rotary switch.

How the blocking device is designed and embodied is not essential here for the embodiment of the present invention as long as the blocking device gives a clear tactile guiding or feedback in case of risk of jumping over an intermediate switching position of the actuating element during switching. According to one embodiment of the invention, the blocking device does, however, comprise a means for providing an opposing force. The blocking device generates a stronger opposing force in case of deflection of the rotary switch from an intermediate switching position into another switching position than during the preceding deflection of the rotary switch into the intermediate switching position, or a markedly greater switching energy (force-path integral) is necessary for deflecting the rotary switch into the other switching position than for deflecting the rotary switch into the intermediate switching position.

This advantageously leads to the circumstance that the intermediate switching position actually intended by the operator or driver is indeed engaged or remains engaged when the rotary switch was turned erroneously too fast or with a somewhat excessively strong force, because the opposing force provided by the blocking device acts like a braking ramp for the motion of the rotary switch and of the hand performing the actuation.

According to another, preferred embodiment of the present invention, the rotary switch can be moved, in addition to its rotatability, essentially linearly along at least one other direction of motion. The additional direction of motion is different from the direction of rotary motion, especially in the radial or axial direction relative to the rotary switch. The mobility of the rotary switch along the additional direction of motion can be advantageously used to control additional functions of the same technical system, or for the additional possibility of controlling another device.

However, the mobility of the rotary switch along the at least one additional direction of motion can also be used especially in connection with the blocking device of the actuating device according to the present invention, as this is intended according to another, especially preferred embodiment of the present invention. The blocking device comprises here a gate shift means, the gate shift means requiring a deflection of the rotary switch along the additional direction of motion for the deflection of the rotary switch from an intermediate switching position into another switching position.

In other words, this means that an unintended jumping over of intermediate switching positions during switching by turning the rotary switch too fast or too strongly is ruled out entirely by the gate shift means of the blocking device, because the direction of motion of the rotary switch or of the actuating hand, which is necessary for deflecting the rotary switch up to the intermediate switching position differs from the direction of motion of the rotary switch or of the hand that has to take place for deflecting the rotary switch from the intermediate switching position into the other switching position because of the presence of the blocking device and the gate shift means.

The gate shift means may be designed for this purpose, for example, such that the deflection of the rotary switch into the intermediate switching position takes place in the form of a simple rotary motion of the rotary switch, whereas an essentially linear motion of the entire rotary switch along a radial or axial direction of the rotary switch must take place for the deflection of the rotary switch from the intermediate switching position into the other switching position. Both a linear motion and then another rotary motion may just as well be necessary at first for moving the rotary switch from the intermediate switching position into the other switching position. It is also possible to use the reverse case, in which a linear motion of the rotary switch is necessary for deflecting the rotary switch into the intermediate switching position and a rotary motion is necessary for the subsequent deflection into the other switching position.

Provisions are made according to another embodiment of the present invention for the actuating device to be connected to a display means, for example, a separate display means in the area of the instrument panel, or for the actuating device itself to comprise a display means, which may be arranged, for example, in the immediate area of the actuating element.

An actuating device with a display means of its own is especially advantageous when actuating technical systems whose operating state is not immediately visible to the operator, which is also the case, for instance, in vehicle transmissions. The display means is used now, for example, to signal the current shifting or operating state of the transmission in the immediate area of the actuating element or rotary switch, with which the motor vehicle transmission is controlled. Such a display means is especially advantageous in the case of actuating elements that always automatically reset into the basic position, as in this case, because the operating state of the technical system or vehicle transmission being controlled therewith cannot or shall not be inferred from the position of the actuating element itself.

Furthermore, an operating state of the system or vehicle transmission which may possibly be assumed automatically, for example, an automatically engaged parking brake when the driver leaves the vehicle, can also be readily taken into account and correctly displayed at any time by the display means in this manner. The problems described in the introduction with the position of the actuating elements from the state of the art, which are additionally also used as a display, and which does not always agree with the operating state of the system being controlled in the case described, are completely eliminated.

According to another, preferred embodiment of the present invention, provisions are, furthermore, made for both the currently selected operating state of the system or transmission as well as any other selectable operating state to be always displayed at the same location of the display means. It is thus possible to determine the operating state in which the system or transmission currently is by one look, and, moreover, any other operating state of the system or transmission is thus always selected independently from the instantaneous operating state in the same manner or with the same motion process, which is favorable for the possibility of intuitive operation of the actuating device.

According to another preferred embodiment of the present invention, the rotary switch can be sunk into a recess of a console along its axial direction. The actuating device especially preferably now has a means that can be driven by a motor for moving the rotary switch along its axial direction.

This embodiment of the present invention has especially the advantage that an optionally automatically controlled sinking motion of the rotary switch into the recess of, for example, the center console of a motor vehicle can take place. This property of the actuating device can be used, on the one hand, for design purposes and thus it improves the ergonomics and the comfort in the motor vehicle.

On the other hand, the rotary switch that can be sunk into the console can also be used as an immediately understandable operation display of the system or vehicle transmission controlled therewith. A rotary switch sunk in the center console may thus mean, for example, that the system or motor vehicle transmission being controlled therewith is not ready to operate, for example, when the ignition is not switched on, the doors are still open, or the like, whereas the rotary switch extended from the center console immediately signals the readiness of the system or transmission to operate in an understandable manner.

The present invention will be explained in more detail below on the basis of drawings, which show exemplary embodiments only. The various features of novelty which characterize the invention are pointed out with particularity in the claims annexed to and forming a part of this disclosure.

For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
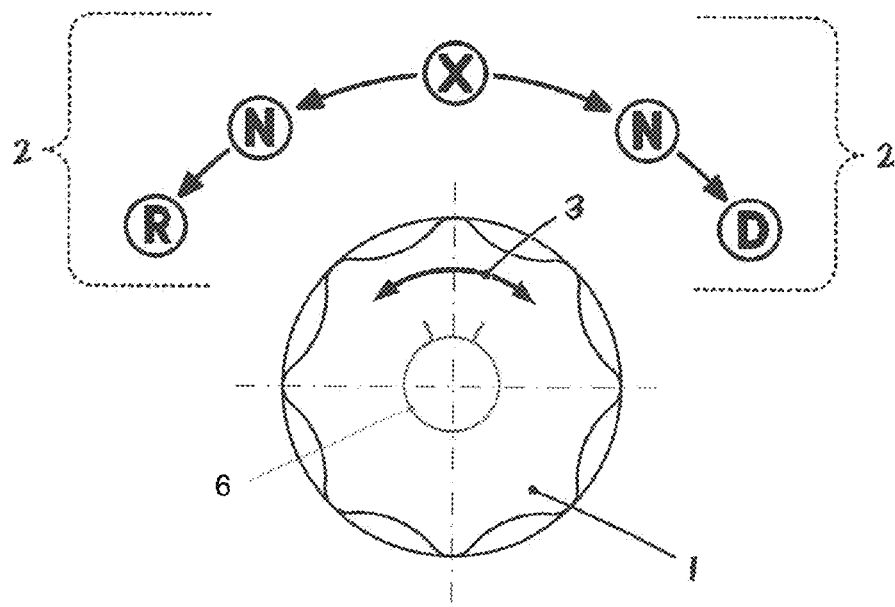
FIG. 1 is a schematic top view of a first embodiment of an actuating device for a vehicle transmission.

Referring to the drawings in particular, FIG. 1 shows a schematic view of the rotary switch 1 and the display means 2 of a first embodiment of the actuating device according to the present invention. This embodiment is an actuating device for an automatic transmission of a vehicle.

It can be immediately recognized at first from the view in FIG. 1 that the rotary switch 1 can be turned to the left along its direction of rotary motion 3 in order to select the shifting states "N" or "R" starting from a starting position of the rotary switch 1, which is designated by "X" here, and that the rotary switch 1 can, furthermore, also be turned to the right along its direction of rotary motion 3 in order to select now the shifting state "N" or the shifting state "D."

The actuating device is designed here according to the present invention such that the rotary switch 1 will again automatically assume the basic position at "X" after being released from each of the shift positions "N," "R" and "D."

The middle position of the display means marked by the symbol "X" can now be used especially to display the particular gear of the vehicle transmission that has just been selected, namely the shift state of the device after the selection action. The instantaneous operating state of the vehicle transmission or the instantaneously engaged gear can thus be detected by one look.

If the instantaneously selected gear of the vehicle transmission is to be changed by means of an intervention by the driver, this is carried out by rotating the rotary switch 1 either counterclockwise or clockwise, along the direction of rotary motion 3. The instantaneously engaged gear displayed at "X" is now disengaged at first in the exemplary embodiment independently from the selected direction of rotation of the rotary switch 1 and the neutral position "N" is engaged, instead.

When the rotary switch 1 is turned further beyond the neutral position "N," the opposing force of the blocking device 6, 7 of the actuating device must first be overcome. The opposing force of the blocking device is markedly stronger during the deflection of the rotary switch 1 from the neutral position "N" into one of the shift positions "R" or "D" than that for deflecting the rotary switch 1 from the starting position "X" into one of the two intermediate positions of the rotary switch 1 which are associated with the neutral position "N" of the vehicle transmission.

Figure 2:
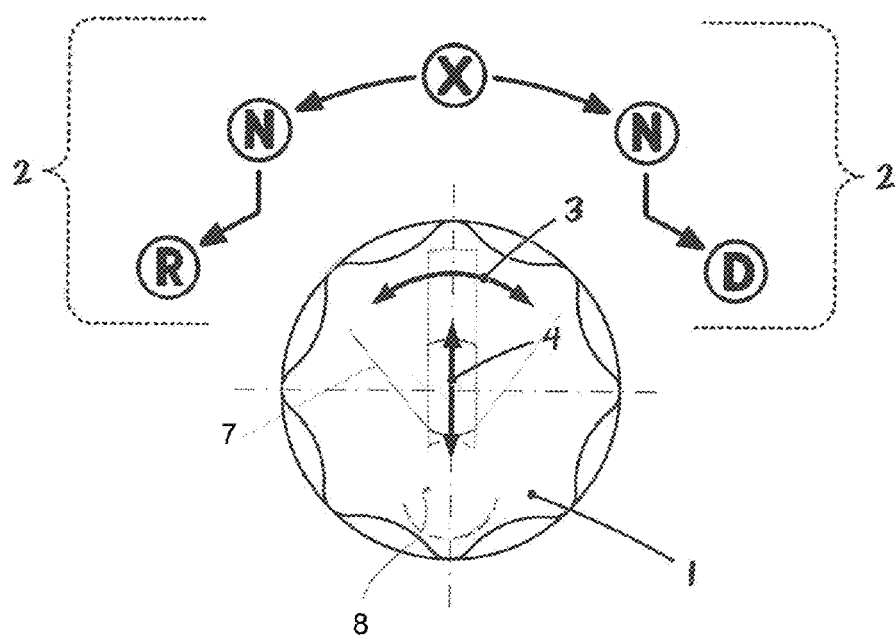
FIG. 2 is a schematic top view of another embodiment of an actuating device according to the present invention in a view corresponding to that in FIG. 1.

FIG. 2 shows a second embodiment of an actuating device for a vehicle transmission with a rotary switch 1. The embodiment according to FIG. 2 differs from the embodiment according to FIG. 1 especially in that the rotary switch 1 according to FIG. 2 can also be displaced, moreover, in a radial direction 4 or along the plane of the vehicle console (not shown), besides the rotary motion 3 about its axis. The blocking device of the actuating device according to FIG. 2 also differs in this connection from the blocking device of the actuating device according to FIG. 1.

The view in FIG. 2 can, furthermore, also be interpreted such that the rotary switch 1 according to FIG. 2 can also be pushed or pulled in the axial direction, in other words, displaced along its axis of rotation—instead of along the radial direction 4—besides the rotary motion 3 about its axis.

To engage one of the two gears "R" or "D" with the rotary switch 1 according to FIG. 2 starting from the starting position "X" or starting from the instantaneously engaged gear, always displayed at "X,", the rotary switch 1 must correspondingly be turned first up to a rotation stop into one of the two intermediate positions associated with the neutral position "N" of the vehicle transmission along its direction of rotary motion 3.

As a consequence of the blocking device of the actuating device according to FIG. 2, the rotary switch 1 cannot then be turned further, because a corresponding shift gate 8 of the blocking device 7 of the rotary switch 1 prevents this. The rotary switch 1 must rather be displaced first linearly downward relative to the drawing in its direction of radial motion 4 for selecting one of the gears "R" or "D" or pushed or pulled, instead, in the axial direction in the mentioned embodiment having axial motion. The shift gate of the blocking device of the rotary switch 1 permits a further rotation of the rotary switch 1 and the selection of the desired gear "R" or "D" only thereafter. An inadvertent jump over the intermediate switching position of the rotary switch 1 associated with the neutral position "N" of the vehicle transmission during shifting is thus effectively prevented from occurring under all circumstances.

Figure 3:
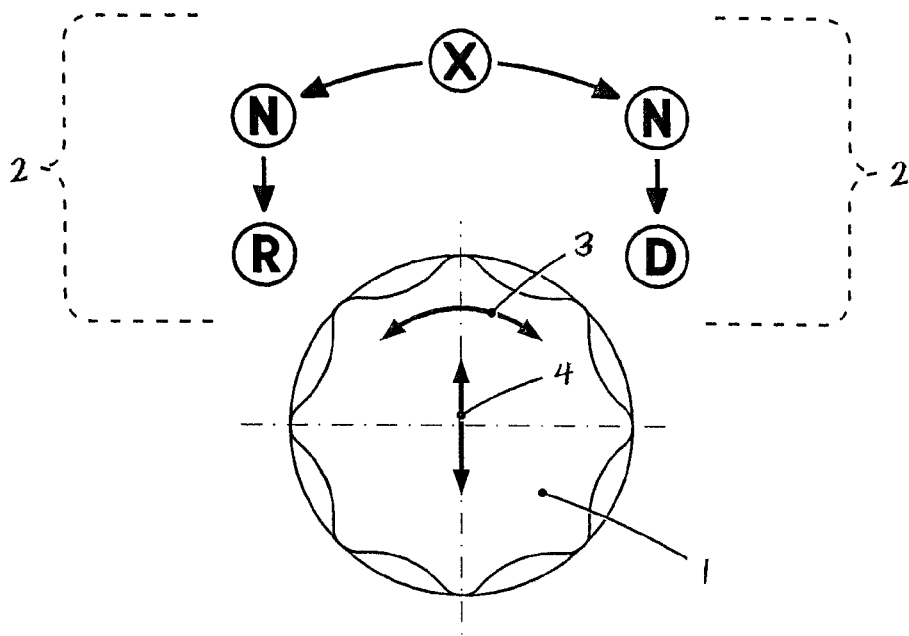
FIG. 3 is a schematic top view of a third embodiment of an actuating device according to the present invention in a view corresponding to those in FIGS. 1 and 2.

Another embodiment of an actuating device with a rotary switch for controlling an automatic transmission of a vehicle is shown in FIG. 3. The embodiment according to FIG. 3 differs from the embodiment according to FIG. 2 essentially only in that the selection of one of the gears "R" or "D" starting from the particular intermediate switching position "N" of the rotary switch 1 takes place immediately by the rotary switch being displaced linearly (sliding) along its direction of radial motion downward 4 relative to the drawing.

Just as in FIG. 2, the view according to FIG. 3 can be interpreted here such that the selection of one of the gears "R" or "D" starting from the particular intermediate switching position "N" of the rotary switch 1 takes place by axial pushing, optionally also by pulling the rotary switch along its axis of rotation, instead of by radial motion. The additional rotary motion of the rotary switch 1, which is (additionally) still necessary in the embodiment according to FIG. 2 subsequent to the linear displacement of the rotary switch 1, is eliminated in the embodiment according to FIG. 3.

Figure 4:
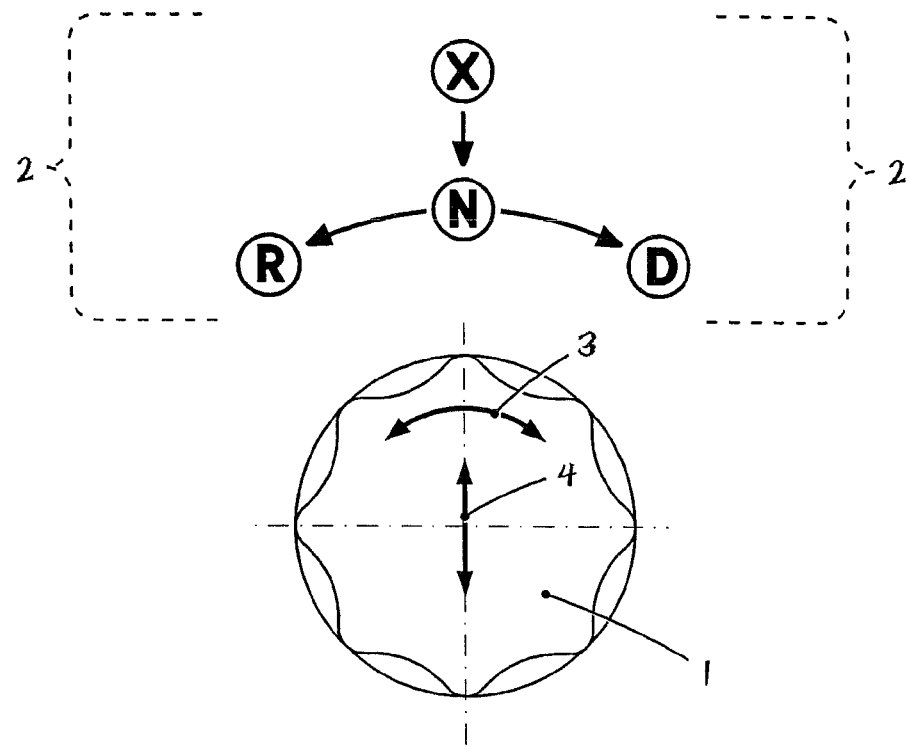
FIG. 4 is a schematic top view of a fourth embodiment of an actuating device according to the present invention in a view corresponding to those in FIGS. 1 through 3.

A fourth embodiment of an actuating device for a vehicle transmission with a rotary switch is shown in FIG. 4. This embodiment differs from the preceding embodiments especially in that only one switching position of the rotary switch 1 is associated with the neutral position "N" of the vehicle transmission, as well as in that both the neutral position "N" of the vehicle transmission and the display of the instantaneously engaged gear "X" are associated with the initial rotation position of the rotary switch 1.

The selection of one of the gears "R" or "D" thus takes place in the case of the embodiment according to FIG. 4 such that the rotary switch 1 is first displaced starting from its starting position or basic position linearly downward relative to the drawing along its direction of radial motion 4 (or, for example, it is pushed in along its axial direction in another embodiment). As a consequence of the blocking means of the actuating device, which comprises a shift gate, it is subsequently again necessary to change the direction of motion and to carry out a rotary motion 3 of the rotary switch 1 in the desired direction subsequent to the linear motion 4. Any unintended jumping over of the intermediate switching position of the rotary switch 1, which said intermediate switching position is associated here with the neutral position "N" of the vehicle transmission, is effectively prevented from occurring in this manner as well.

Figure 5:
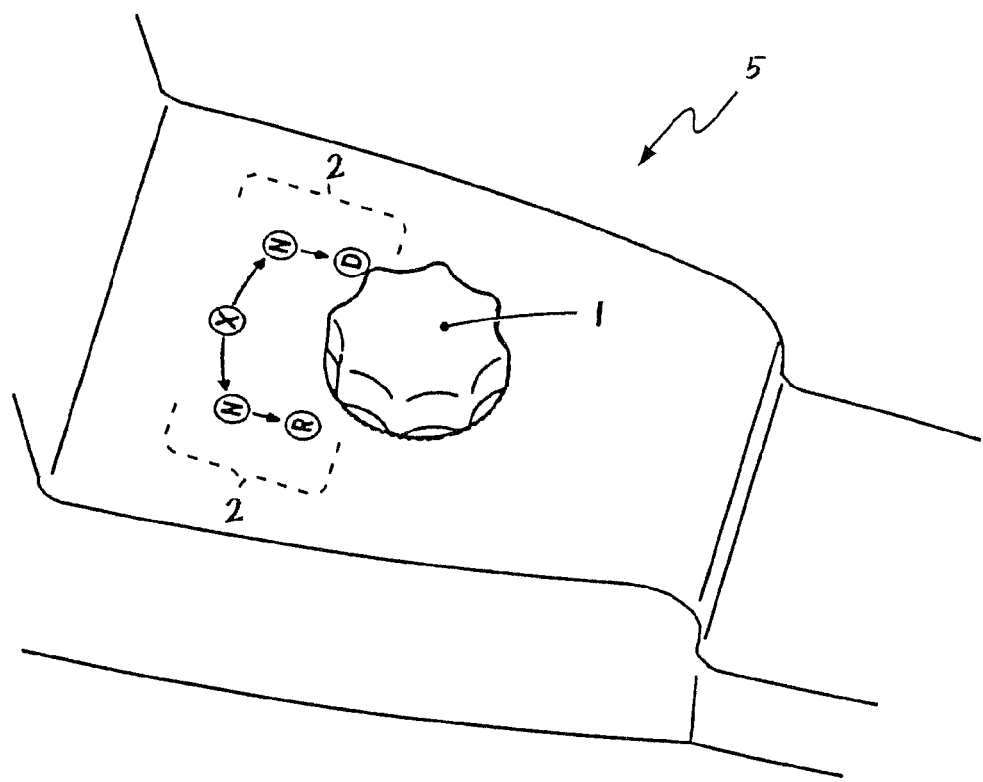
FIG. 5 is a schematic isometric view of an actuating device according to FIG. 3 with the rotary switch extended.
Figure 6:
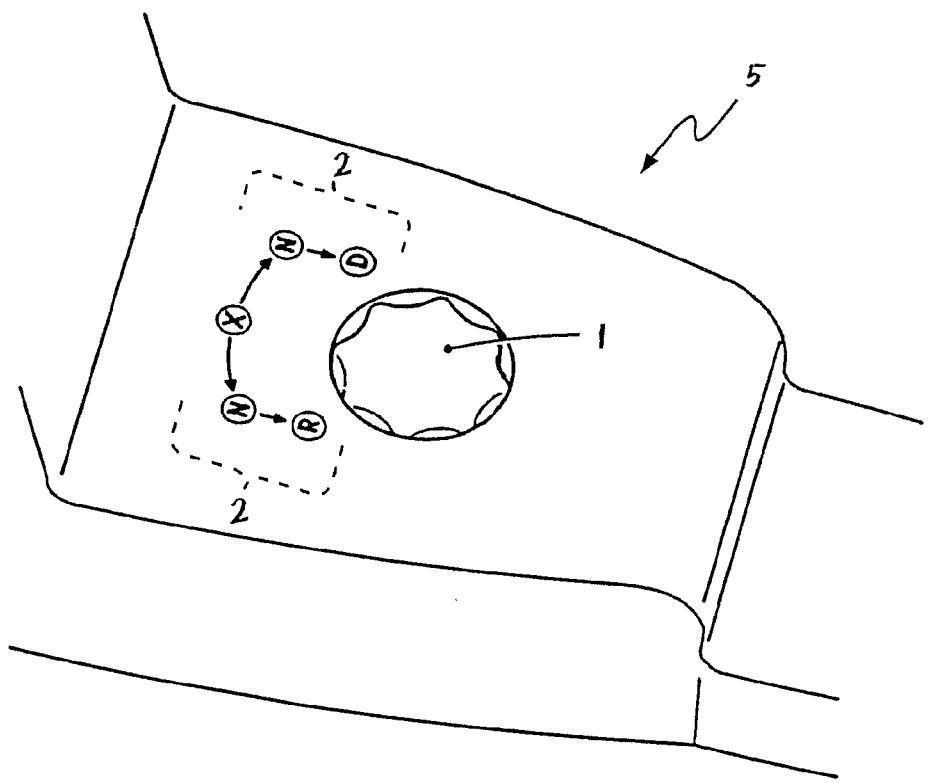
FIG. 6 is a schematic isometric view showing the actuating device according to FIGS. 3 and 5 with sunk rotary switch.

FIGS. 5 and 6 show the embodiment according to FIG. 3 in the installed state in the center console 5 of a motor vehicle. The rotary switch 1 for actuating the vehicle transmission is in the extended operating state in the view shown in FIG. 5, so that the readiness of the vehicle transmission to operate and the readiness of the vehicle to be driven is also unmistakably signaled to the driver.

Contrary hereto, the rotary switch 1 in the view according to FIG. 6 is sunk in the center console 5. The sinking motion of the rotary switch 1 along its axis of rotation, which is necessary for this, takes place by means of an automatically controlled motor drive (not shown), which is likewise located in the area of the center console 5. It is signaled to the driver by the sunk rotary switch 1 in an immediately recognizable manner that the vehicle transmission or the motor vehicle is not ready to operate for certain reasons, for example, because the ignition has not been turned on, or because not all doors have been closed yet.

It thus becomes clear as a result that thanks to the present invention, an actuating device is provided for electrically or electronically controlled technical systems, which permits especially a self-explanatorily intuitive and hence as error-free an actuation as possible of the technical system. In particular, the unintended jumping over of intermediate switching positions of the actuating element during switching is now effectively prevented from happening. At the same time, an intuitively detectable tactile feedback of the switching state of the actuating element or of the state of the system is embodied thanks to the present invention. Moreover, the actuating device according to the present invention can be designed and arranged in the interior space, especially when used on the motor vehicle, with an especially great freedom in terms of design.

Thus, the present invention makes a considerable contribution to the improvement of ergonomics, safety and operability of technical systems, especially in respect to use for controlling automatic transmissions and the like on motor vehicles.

While specific embodiments of the invention have been shown and described in detail to illustrate the application of the principles of the invention, it will be understood that the invention may be embodied otherwise without departing from such principles.

The invention claimed is:

1. An actuating device for a shift-by-wire speed-change gear technical system, the actuating device comprising:
   an actuating element with at least three shift positions including a basic position, wherein said actuating element can be deflected from said basic position at least in one direction into an intermediate switching position for selecting an operating state of the technical system and said actuating element can be deflected from said intermediate switching position into at least one other switching position located farther away from said basic position than said intermediate switching position for selecting at least one other operating state of the technical system, said intermediate switching position corresponding to a neutral shift state of an automatic transmission, said at least one other switching position corresponding to one of a drive shift state of the automatic transmission and a reverse shift state of the automatic transmission, said actuating element comprising a rotary switch, which automatically resets into said basic position from all switching positions, said actuating device having a blocking device against unintended deflection of said rotary switch from said intermediate switching position into said at least one other switching position.

2. An actuating device in accordance with claim 1, wherein said blocking device comprises a means for providing an opposing force, which generates a stronger opposing force during a deflection of said rotary switch starting from said intermediate switching position into said at least one other switching position than during the deflection of said rotary switch into said intermediate switching position.

3. An actuating device in accordance with claim 1, further comprising:
a separate display device for displaying a shift position state of said actuating element wherein the actuating device is connected to said separate display device, said display device being located adjacent to said actuating element.

4. An actuating device in accordance with claim 1, further comprising:
a display forming a part of said actuating device, said display being located adjacent to said actuating device.

5. An actuating device in accordance with claim 1, wherein both the current operating state of the system and the other selectable operating states are displayed at a separate, fixed location of said display.

6. An actuating device in accordance with claim 1, wherein said automatic transmission is in one of said neutral shift state, said drive shift state and said reverse shift state based on said selection with said rotary switch automatically reset into said basic position.

7. An automatic transmission actuating device, the actuating device comprising:
a rotary switch with three shift positions including a basic position, wherein said rotary switch has a deflection path from said basic position in one rotational direction into an intermediate switching position for selecting a neutral shift state of an automatic transmission and said rotary switch has another deflection path from said intermediate switching position into another switching position located farther away from said basic position than said intermediate switching position for selecting one of a drive shift state and a reverse shift state of an automatic transmission, said rotary switch being automatically repositioned into said basic position upon release from said intermediate switching position and said rotary switch being automatically repositioned in another rotational direction into said basic position upon release from said another switching position, said one rotational direction being opposite said another rotational direction, said another deflection path including a blocking path portion, said blocking path portion applying an opposing force in said another rotational direction to act against an unintended deflection of said rotary switch from said intermediate switching position into said another switching position.

8. An actuating device in accordance with claim 7, wherein said opposing force generates a stronger opposing force along a portion of said another deflection path during a deflection of said rotary switch starting from said intermediate switching position into said another switching position than during the deflection of said rotary switch along said deflection path into said intermediate switching position.

9. An actuating device in accordance with claim 7, further comprising a separate display device for displaying a shift position state of said rotary switch, wherein the rotary switch is connected to said separate display device, said display device being located adjacent to said rotary switch.

10. An actuating device in accordance with claim 7, further comprising a display forming a part of said actuating device, said rotary switch being located adjacent to said display.

11. An actuating device in accordance with claim 10, wherein both the current operating state of the system and the other selectable operating states are displayed at a separate, fixed location of said display.

12. An actuating device in accordance with claim 7, wherein said automatic transmission is in one of said neutral shift state, said drive shift state and said reverse shift state based on said selection with said rotary switch repositioned into said basic position.

13. An automatic transmission actuating device, the actuating device comprising:
a rotary switch with a plurality of shift positions, said plurality of shift positions including a basic position, a first intermediate switching position, a second intermediate switching position, a third switching position located farther away from said first intermediate switching position and a fourth switching position located farther away from said second intermediate switching position, said basic position being arranged between said first intermediate switching position and said second intermediate switching position, wherein said rotary switch has a first deflection path from said basic position in a first rotational direction into said first intermediate switching position for selecting a neutral shift state of an automatic transmission and said rotary element has a second deflection path from said first intermediate switching position into said third switching position in said first rotational direction for selecting a drive shift state of an automatic transmission, said rotary switch being automatically repositioned into said basic position upon release from said intermediate switching position in a second rotational direction and said rotary switch being automatically repositioned in said second rotational direction into said basic position upon release from said third switching position, said first rotational direction being opposite said second rotational direction, said rotary switch having a third deflection path from said basic position in said second rotational direction into said second intermediate switching position for selecting said neutral shift state of said automatic transmission and said rotary element having a fourth deflection path from said second intermediate switching position into said fourth switching position for selecting a reverse shift state of said automatic transmission, said rotary switch being automatically repositioned into said basic position upon release from said second intermediate switching position in said first rotational direction and said rotary switch being automatically repositioned in said first rotational direction into said basic position upon release from said fourth switching position.

14. An actuating device in accordance with claim 13, wherein said second deflection path includes a first blocking path portion, said first blocking path portion applying a first opposing force in said second rotational direction to act against an unintended deflection of said rotary switch from said first intermediate switching position into said third switching position, said fourth deflection path including a second blocking path portion, said second blocking path portion applying a second opposing force in said first rotational direction to act against an unintended deflection of said rotary switch from said second intermediate switching position into said fourth switching position.

15. An actuating device in accordance with claim 13, further comprising a separate display device for displaying a shift position state of said rotary switch, wherein the rotary switch is connected to said separate display device, said display device being located adjacent to said rotary switch.

16. An actuating device in accordance with claim 13, further comprising a display forming a part of said actuating device, said rotary switch being located adjacent to said display.

17. An actuating device in accordance with claim 16, wherein the current operating state of the system and the other selectable operating states are displayed at a separate, fixed location of said display.

18. An actuating device in accordance with claim 13, wherein said automatic transmission is in one of said neutral shift state and said driving state with said rotary switch repositioned into said basic position in said second rotational direction, said automatic transmission being in one of said neutral shift state and said reverse shift state with said rotary switch repositioned into said basic position in said first rotational direction.

* * * * *